June 14, 1966   C. G. P. OLDERSHAW ETAL   3,255,864
OKRA ALIGNING APPARATUS
Filed July 29, 1963   3 Sheets-Sheet 1

INVENTORS
CHARLES G. P. OLDERSHAW
ROBERT V. KING
WILLIAM E. LA FERNEY
BY
ATTORNEY

June 14, 1966    C. G. P. OLDERSHAW ETAL    3,255,864
OKRA ALIGNING APPARATUS

Filed July 29, 1963    3 Sheets-Sheet 3

United States Patent Office 3,255,864
Patented June 14, 1966

3,255,864
OKRA ALIGNING APPARATUS
Charles G. P. Oldershaw, Avon, N.Y., and Robert V. King, Searcy, and William E. La Ferney, Griffithville, Ark., assignors to General Foods Corporation, White Plains, N.Y., a corporation of Delaware
Filed July 29, 1963, Ser. No. 298,076
12 Claims. (Cl. 198—33)

This invention relates generally to conveying mechanism and, more particularly, to conveying mechanism adapted to align articles fed thereto in random orientation so as to deliver said articles to associated processing equipment in a predetermined orientation.

The invention is shown herein in an embodiment adapted for aligning whole okra and delivering same in proper orientation to an associated trimming apparatus. A whole okra has a shape which is generally round in cross section, its length being substantially greater than its maximum diameter. At one end of the vegetable, i.e., the end to which the stem is attached, is a cap which is a hard bulbous portion, this end being hereinafter referred to as the cap end. The remainder of the vegetable comprises a pod which terminates in a relatively pointed tip hereinafter referred to as the tip end of the vegetable. Since the density of the cap is considerably greater than that of the pod portion, the center of gravity of whole okra is located considerably closer to the cap end than the tip end, and advantage is made of this characteristic in the present invention.

The preparation of okra for human consumption involves the removal of all or part of the cap which is generally considered to be a non-edible portion. The removal of the cap has been ordinarily accomplished either by slicing it off with a knife by hand, or by trimming it off by a machine which must be fed by hand. Both methods involve considerable labor and are relatively slow and costly for the commercial production of okra.

The present invention in the embodiment herein disclosed is intended for use in conjunction with an okra trimming machine and serves to eliminate the prior necessity of feeding the trimming machine by hand. The machine herein disclosed includes a vibrating screen to which okra are fed at a predetermined feed rate by a conveyor associated with a feed hopper. The screen is formed with a plurality of openings of a size adapted to accommodate the maximum diameter of the okra. The vibratory motion imparted to the screen causes the okra to progress from the input end of the screen to the opposite end thereof, during which travel the okra pass over the aforesaid openings. The size of said openings is such as to prevent the okra from falling through tip end first but to permit the okra to fall through cap end first. Disposed below the screen is a conveyor spaced from the screen at a proper distance for limiting the free dropping of the okra through said openings, thereby serving to control the direction in which the tip ends will fall as they clear said screen openings so as to cause the entire okra to eventually drop on said conveyor oriented with the cap end leading. The conveyor is designed to retain the okra in the desired orientation for delivery to the trimming apparatus, not disclosed or claimed herein, which operates to effect the trimming function when the okra are delivered thereto with the cap end foremost or leading. Thus, the present apparatus operates to completely eliminate the need for manual handling of the okra, thereby greatly reducing the cost of this trimming operation from that heretofore required in commercial production.

It is therefore an object of this invention to eliminate the need for manually feeding articles to article processing apparatus adapted to receive the articles in a predetermined orientation.

It is a further object of the invention to provide an improved feeding device adapted to align the articles being fed in a predetermined orientation.

It is a further object of the invention to provide an article orienting feed mechanism which is efficient in operation, of durable construction, and relatively inexpensive to manufacture.

Further objects of the invention together with the features contributing thereto and the advantages resulting therefrom will be apparent from the following description when read in conjunction with the drawings wherein.

Figure 1:
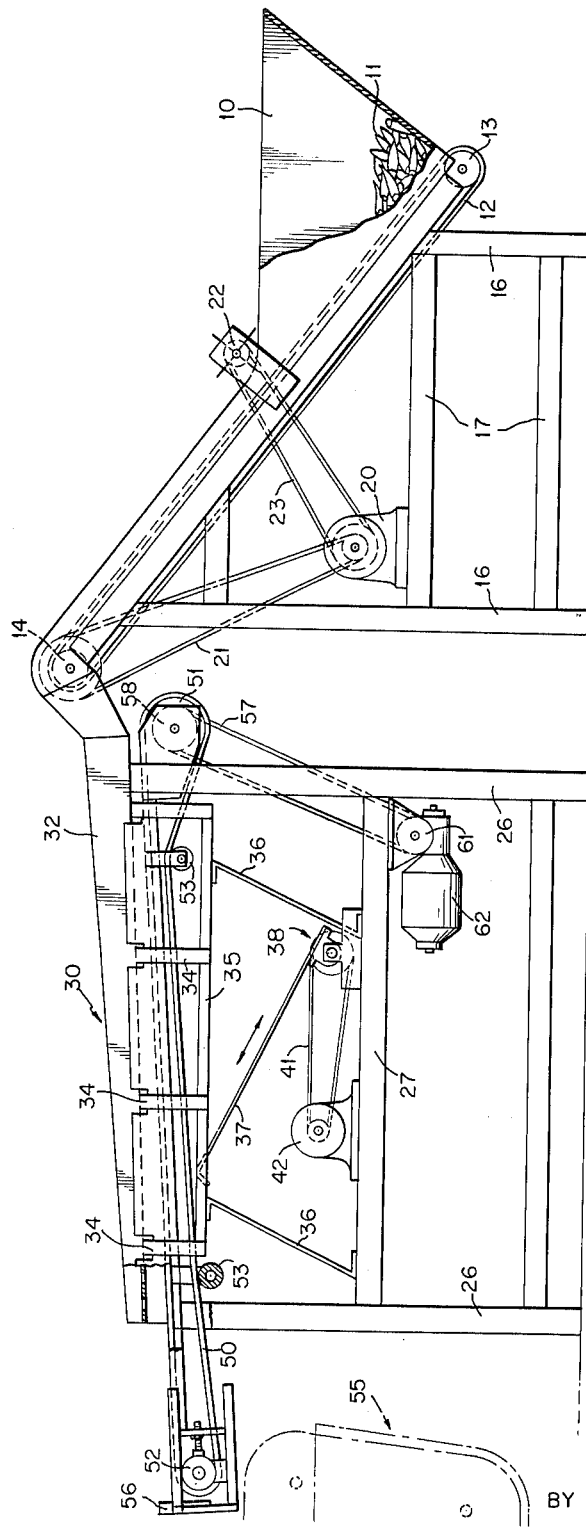
FIG. 1 is a side elevation of the apparatus.

As can be seen in FIG. 1, the mechanism includes an input hopper 10 which is shown as being loaded with a quantity of whole okra 11. Associated with the input or feed hopper 10 is a conveyor comprised of a belt 12 strung about a drum 13 and a drum 14 which is somewhat elevated relative to the drum 13, thereby providing an upwardly inclined flight path for the conveyor belt which is, accordingly, provided with transverse ribs 15, see FIG. 2, to provide a positive engagement with the feeding okra.

The feed hopper 10 and associated conveyor are suitably mounted on a supporting framework which may include upright supports 16 and horizontal supports 17. Mounted on one of the horizontal supports 17 is a motor 20 for driving the feed belt 12 by means of a drive belt 21 running between pulleys mounted on the motor shaft and on the feed belt drum 14. Preferably, the feed conveyor also includes a counterrotating baffle 22 mounted above the feed belt 12 at its point of exit from the feed hopper 10 to provide a restricted feed throat for the hopper which prevents overloading of the feed conveyor. Said baffle is driven by motor 20 through a drive belt 23.

Figure 2:
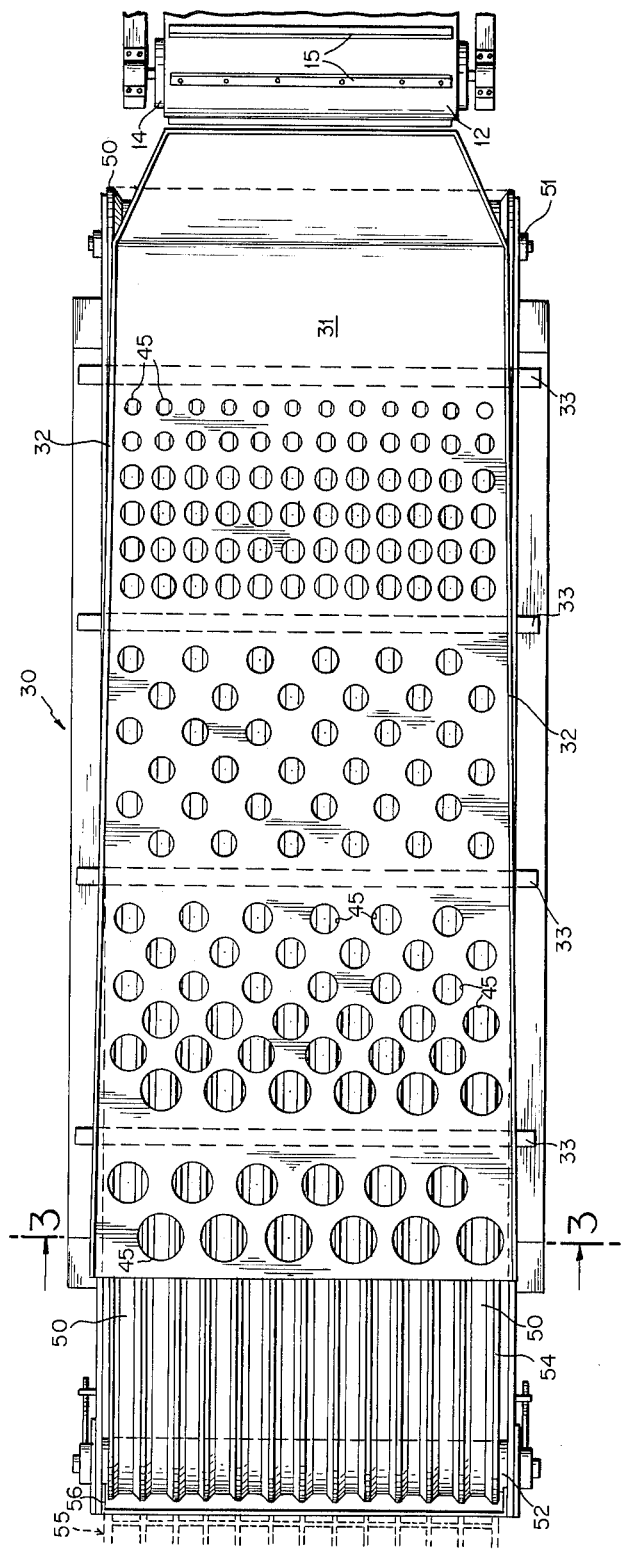
FIG. 2 is a plan view of the apparatus with the feed hopper broken away.
Figure 3:
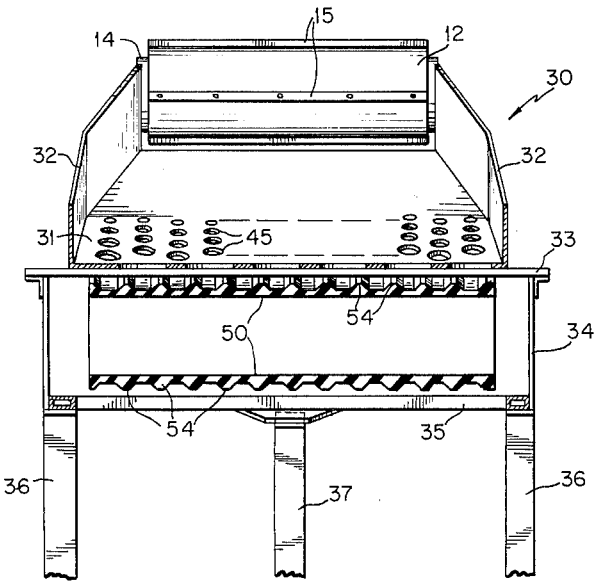
FIG. 3 is a sectional view taken along the line 3—3 of FIG. 2.

The okra is thus fed by the conveying mechanism from the input hopper 10 to the aligning section of the apparatus which is mounted on a separate framework comprised of upright supports 26 and a horizontally disposed frame plate 27. Mounted for vibratory motion on said framework is an aligning screen 30 formed so as to define a feed trough having a flat bottom surface 31 over substantially its entire length and side walls 32. At its input end the bottom surface 31 of the screen bends upwardly and the side walls 32 thereof bend inwardly to define a feed chute for receiving okra discharged from the feed converoy belt 12 and for directing same onto the flat bed or bottom surface 31 of the screen. The aligning screen 30 is supported by an open independent framework consisting of cross ribs 33, see also FIG. 3, underlying and suitably secured to the bottom surface of the screen, said ribs being supported at each end thereof by upright bars 34 carried by a horizontal frame plate 35. The frame plate 35 is supported near each corner thereof by flexible bars 36 mounted in an inclined manner and secured at their lower ends to the plate 27 of the main framework. Vibratory motion is imparted to the aligning screen by means of an actuating link 37 secured at its upper end to the screen supporting plate 35 and at its lower end to a vibration emitter 38 which may be of any conventional type such as, for example, an eccentric carried by a driven shaft, the vibration emitter being driven through a drive belt 41 running to a motor 42 mounted on the frame plate 27. It will be noted that the actuating link 37 extends along a line which is substantially perpendicular to the longitudinal axis of the flexible support bars 36, the arrangement serving to give the aligning screen 30 vibratory movement in an oblique direction having a major horizontal component and a minor vertical component. The screen 30 is mounted with its bed or bottom surface 31 inclining downwardly slightly from the input end towards the output or discharge end thereof so that the vibratory motion transmitted to the screen causes the okra lying in the bed thereof to progress from the input end to the discharge end, i.e., from right to left as shown in FIGS. 1 and 2.

The bottom surface 31 of the screen 30 is perforated to provide a plurality of openings or holes 45 preferably circular in shape and arranged in a plurality of parallel adjacent rows extending longitudinally from the input to the discharge end of the screen. In the present instance, twelve such rows are shown although a fewer or greater number could be employed, depending upon the desired capacity of the mechanism. The holes 45 are of a size that will accommodate the cross-sectional dimensions of the okra so as to enable the okra to pass freely therethrough when in an upright position relative thereto. Since within any batch of okra there will be some variation in okra size, the holes within each row are of graduated dimension, the holes at the input end being the smallest for receiving the smallest okra of a given batch, the holes at the opposite or discharge end being the largest for receiving the largest okra of a given batch. In the case of the larger size holes, the holes of adjacent rows are arranged in staggered offset relation to one another in order to allow a maximum number of rows within the overall width dimensions of the screen. The size of the openings 45 is determined not only by the cross-sectional dimensions of the okra, but also by the differential in length between the okra's center of gravity and cap end on one hand and the center of gravity and the tip end on the other hand, said openings have a diameter greater than the former distance and lesser than the latter distance. Thus as the okra progress across the bed of the screen 30, the passage of the tip end of the okra over an opening 45 will not permit the okra to drop therethrough, but only when the cap end of the okra is over an opening will it drop therethrough, thereby causing the okra in each case to fall through the bed of the screen cap end first.

Disposed below the vibratory screen 30 is a conveyor belt 50 drawn around a drive drum 51 and a drum 52 suitably supported for rotation by the main framework of the apparatus. The lower reach of the drive belt 50 is guided over a pair of idler rolls 53. The drive belt is formed with a plurality of longitudinally extending ridges 54 which in effect corrugate the surface of the belt and define a plurality of parallel grooves each of which aligns vertically with one of the rows of perforations 45 in the screen 30. The upper reach of the belt 50 is disposed at an incline, running downwardly from the infeed end to the discharge end, slightly greater than the incline of the bottom plate of the screen 30. The belt 50 is spaced from the bed 31 of the screen 30 at a distance which will limit the drop of the okra through the holes in the screen and prevent the okra from completely penetrating said openings until the conveyor has advanced the cap end a sufficient distance forward to insure that the okra in clearing the opening will fall into the respective groove or channel of the conveyor belt with its cap end foremost. Thus the okra are retained within the channels of the belt 50 with their cap end leading while being transported by the belt to the discharge end thereof which is at the point where it wraps around the drum 52.

The aligning apparatus of this invention is designed for use with associated processing equipment indicated generally at 55 and provided with okra conveying mechanism adapted to receive the okra when in a vertical position with its cap end lowermost. Accordingly, the discharge end of the conveyor belt 50 is disposed so as to overlie the conveying mechanism of the associated processing equipment so that as the okra rides over the brink of the conveyor belt 50 they will turn to an upright position and drop vertically with the cap end lowermost into the pocket mechanism of the associated equipment 55. In order to assure that the okra assume a vertical position when dropping off the conveyor belt 50 a deflector plate 56 is preferably disposed at the discharge end of the conveyor belt 52 with just enough clearance from the end of the belt to permit the free fall of the okra when in an upright position with its longitudinal axis oriented vertically, thus preventing okra from being thrown off the conveyor belt 50 and landing on the conveyor means of the associated equipment 55 in other than a vertical upright position. The conveyor belt 50 is driven by means of a drive belt 57 stretched around a pulley 58 integral with the drive drum 51 and a pulley 61 driven by a motor 62 mounted on the member 27.

Figure 4:
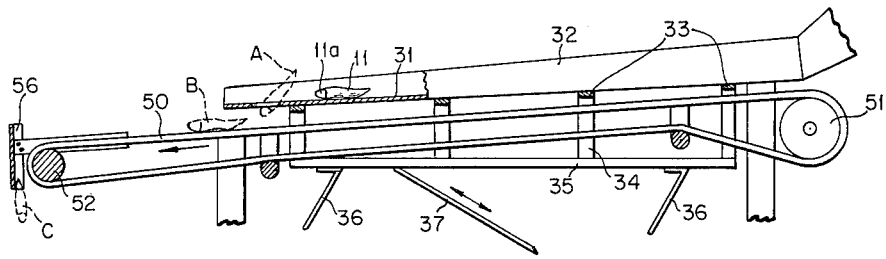
FIG. 4 is a side elevation illustrating diagrammatically the progress of an okra upon passing over an opening in the screen member cap end foremost.
Figure 5:
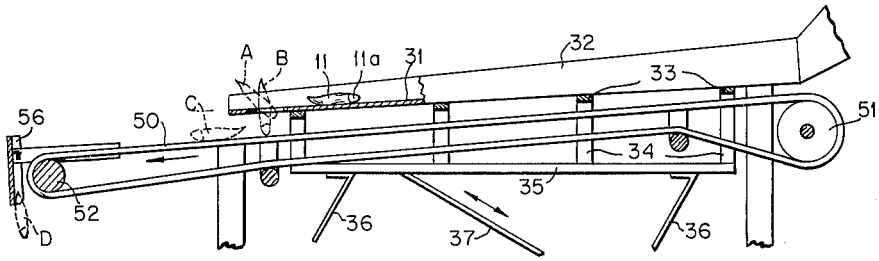
FIG. 5 is a view similar to FIG. 4 illustrating diagrammatically the progress of an okra when passing over a screen opening tip end foremost.

FIGS. 4 and 5 illustrate the operation of the mechanism diagrammatically. In FIG. 4 is shown an okra 11 approaching an opening in the bed 31 of the vibrating screen with its cap end 11a foremost. As the cap end passes over the opening the okra assumes the position indicated A wherein the cap end starts to fall through the opening in the screen. In the position indicated at B the continuously moving conveyor belt 50 has caused the okra to fall onto the belt with its cap end still foremost. Position C illustrates the position the okra assumes as it drops vertically through the gap between the end of the conveyor belt 50 and the deflector plate 56.

FIG. 5 illustrates the function of the mechanism with respect to an okra approaching an opening with its tip end foremost and its cap end 11a trailing. As the okra passes over the opening, the tip end will not drop through since the distance from its tip end to its center of gravity is longer than the diameter of the opening. However, when the cap end 11a clears the edge of the opening the cap end will start to drop through the opening since the distance from the cap end to the center of gravity is less than the diameter of the opening, and this point of the operation is indicated at position A. The okra then drops down to assume a vertical position with its cap end resting on the conveyor belt 50 as indicated at position B. The cap end is then carried forward by the belt to cause the okra to completely penetrate the opening whereupon it falls upon the belt with its cap end foremost as indicated at position C, the operation thus effecting a 180° turn of the okra. The okra is thus carried by the belt to the end of the conveyor 50 whereupon riding over the brink it assumes a vertical position and drops through the gap between the belt and the deflector plate 56 with its cap end lowermost as indicated at position D. Thus, regardless of what orientation the okra may assume when delivered to the screen 30, it can only drop through one of the perforations in the bed of the screen when the cap end overlies one of the openings, thereby insuring that the okra will be aligned in the desired orientation, cap end foremost, when dropping onto the conveyor belt 50 for transfer to the associated processing equipment.

While the invention has been described with specific reference to orientation of okra, it will of course be apparent that the same means can be effectively employed for orienting any similarly shaped article in which the center of gravity lies closer to one end than to the other.

It will also be understood that although there has been described what is considered to be a preferred embodiment of the invention, certain obvious changes in form could be made without departing from the spirit of the invention, and it is therefore intended that the invention be not limited to the specific form herein shown and described nor do anything less than the whole of the invention as hereinafter claimed.

What we claim and desire to secure by Letters Patent is:

1. An apparatus for aligning elongate okra-like articles having a center of gravity closer to one end than to the other end comprising, a trough-shaped screen having a flat bottom surface for supporting said articles fed to one end thereof in random orientation, such surface being formed with openings of a dimension greater than the diameter of said articles and smaller than the distance between said other end and the center of gravity of said articles enabling endwise passage therethrough by said articles and preventing sidewise passage therethrough by said articles, means for vibrating said screen to cause said articles to progress over said openings, the one end of each said article dropping endwise through an opening when said end and said center of gravity overlie an opening, and conveyor means underlying the bottom surface of said screen and spaced therefrom at a distance less than the length of said articles to limit the free fall and to enable complete passage-through an opening by said articles, said conveyor means carrying the said one ends of said articles in the direction of conveyor feed to control the direction of fall of said articles when clear of said openings to thereby align said articles on said conveyor means in uniform orientation relative thereto.

2. The invention according to claim 1 wherein said openings are circular and said dimension represents the diametric dimension of said openings, said openings having a diameter greater than the distance between said one end and the center of gravity of said articles.

3. The invention according to claim 2 adapted to align articles varying in size wherein the openings in said screen at the input end thereof are dimensioned proportionately to the dimensions of the smallest ones of said articles.

4. The invention according to claim 3 wherein said bottom surface inclines downwardly from the input end thereof to cause said articles to progress away from said input end and towards the opposite end of said surface under the influence of said vibrating means, said openings becoming progressively larger along the direction in which said articles progress.

5. The invention according to claim 1 in which said conveyor means comprises a drive belt having longitudinally extending grooves formed therein for retaining said articles in aligned relationship relative thereto.

6. The invention according to claim 5 wherein said openings are arranged in rows running longitudinally from the input end to the opposite end of said screen, each said row being disposed in vertical alignment with one of said grooves in said belt.

7. The invention according to claim 6 adapted for aligning articles varying in size, wherein the bottom surface of said screen slopes downwardly from its input end to cause said articles to progress away from said input end under the influence of said vibrating means, and wherein said openings within each row are of progressively increased size along the direction of feed to accommodate the varying sizes of said articles.

8. The invention according to claim 7 wherein the flight path of said belt slopes downwardly in the direction of feed to a greater degree than the slope of the bottom surface of said screen to progressively increase the spacing between said bottom surface and said belt in the direction of feed.

9. An apparatus for aligning elongate okra-like articles having a center of gravity closer to one end than to the other end comprising, a trough-shaped screen having a flat bottom surface for supporting said article fed to one end thereof in random orientation, said surface sloping downwardly from said one end and being formed with openings of a dimension less than the distance between said other end of the center of gravity of said articles and greater than the distance between said one end and the center of gravity thereof enabling endwise passage therethrough by said articles and preventing sidewise passage therethrough by said articles, flexible means for supporting said screen, means for vibrating said screen on said flexible means in vibratory strokes having a forwardly and upwardly extending axis to cause said articles to progress down the slope of said bottom surface and over said openings, each of said articles upon attaining a position wherein the said one end and its center of gravity overlies an opening dropping endwise through said opening, and a conveyor belt underlying the bottom surface of said screen and spaced therefrom at a distance less than the length of said articles and greater than the diameter thereof to limit the free fall and to enable complete passage through said openings by said articles, said conveyor belt carrying the said one ends of said articles in the direction of conveyor feed to control the direction of fall of said articles when clear of said openings to thereby align said articles on said conveyor belt in uniform orientation relative thereto.

10. The invention according to claim 9 wherein said openings in said bottom surface are circular and said dimension represents the diametric dimension of said openings.

11. The invention according to claim 9 wherein said belt is formed with longitudinally extending grooves formed therein for retaining said articles in aligned relationship relative thereto, and wherein said openings are arranged in rows running longitudinally from the input end to the opposite end of said screen, each said row being disposed in vertical alignment with one of said grooves in said belt.

12. An apparatus for aligning elongate okra-like articles having a center of gravity closer to one end than to the other end comprising, a trough-shaped screen having a flat bottom surface for supporting said articles when fed to the input end thereof in random orientation, said surface sloping downwardly from said input end and being formed with circular openings having a diameter greater than the distance between the center of gravity of said articles and their one end and less than the distance between said center of gravity and the other ends of said articles to enable endwise passage through said openings by said articles and prevent sidewise passage therethrough by said articles, said openings being arranged in rows running longitudinally from the input end of said screen to the opposite end of said screen, flexible means for supporting said screen, means for vibrating said screen in vibratory strokes having a forwardly and upwardly vibratory axis for causing said articles to progress down the slope of said bottom surface and over said openings, each of said articles upon attaining a position wherein the said one end and its center of gravity overlies an opening dropping endwise through said opening, a conveyor belt underlying the bottom surface of said screen and spaced therefrom a distance sufficient to limit the free fall before complete passage but to enable complete passage through said openings by said articles under the influence of the motion of said belt, said conveyor belt carrying the said one ends of said articles in the direction of belt feed to control the direction of fall of said articles when clear of said openings to thereby align said articles on said belt in uniform orientation relative thereto, said belt being formed with longitudinal grooves for retaining said articles in aligned orientation, each said groove being disposed in vertical alignment with one of said rows of openings, a feed hopper for containing said articles, and conveyor means for delivering measured quantities of said articles from said hopper to the input end of said screen.

References Cited by the Examiner

UNITED STATES PATENTS

| | | | |
|---|---|---|---|
| 899,760 | 9/1908 | Remington. | |
| 1,058,116 | 4/1913 | Thompson | 146—86 |
| 2,377,431 | 6/1945 | Lakso | 198—33 |
| 2,466,936 | 4/1949 | Dowie et al. | 193—43 X |
| 2,588,297 | 3/1952 | Scheppe | 193—43 X |
| 3,126,993 | 3/1964 | Van Der Schoot | 193—43 |

FOREIGN PATENTS

| | | |
|---|---|---|
| 392,295 | 5/1933 | Great Britain. |

HUGO O. SCHULZ, *Primary Examiner.*

SAMUEL F. COLEMAN, *Examiner.*

ROBERT J. HICKEY, *Assistant Examiner.*